United States Patent [19]
Akiyama et al.

[11] Patent Number: 4,997,726
[45] Date of Patent: Mar. 5, 1991

[54] SOLID OXIDE ELECTROLYTE FUEL CELL

[75] Inventors: Yukinori Akiyama; Noboru Ishida, both of Kadoma; Shuzo Murakami, Ibaraki; Toshihiko Saito, Kyoto, all of Japan

[73] Assignee: Sanyo Electric Co., Ltd., Moriguchi, Japan

[21] Appl. No.: 477,402

[22] Filed: Feb. 9, 1990

[30] Foreign Application Priority Data

Feb. 15, 1989 [JP] Japan .................................. 1-36711
Apr. 20, 1989 [JP] Japan .................................. 1-100751

[51] Int. Cl.⁵ ............................................. H01M 8/02
[52] U.S. Cl. ............................................ 429/32; 429/35
[58] Field of Search ........................... 429/30, 32, 35

[56] References Cited
U.S. PATENT DOCUMENTS
4,476,196 10/1984 Poeppel et al. .
4,910,100 3/1990 Nakanishi et al. .................... 429/32

Primary Examiner—Donald L. Walton
Attorney, Agent, or Firm—Armstrong, Nikaido, Marmelstein, Kubovcik & Murray

[57] ABSTRACT

A solid oxide fuel cell assembly comprises at least one planar fuel cell consisting of a solid oxide electrolyte sandwiched by an anode and a cathode, and at least two gas separators having gas passages for supplying anode gas and cathode gas to said anode and cathode. The at least one fuel cell and at least two separators are arranged one on the other to form a fuel cell assembly. The gas separators except for the uppermost separator are integrally provided at its periphery with an upwardly extending side wall spaced from adjacent upper gas separator to form a space surrounding the fuel cell located thereon, and the space is charged with a nonconducting high viscous melt. The fuel cell assembly may comprises a plurality of planar fuel cells and a plurality of planar separators arranged one on the another to form a fuel cell stack and may be arranged in a open-topped box-like housing charged with a nonconducting high viscous melt.

18 Claims, 6 Drawing Sheets

SOLID OXIDE ELECTROLYTE FUEL CELL

BACKGROUND OF THE INVENTION

The present invention relates to a solid oxide electrolyte fuel cell and, more particularly, an improved sealing means for solid oxide electrolyte fuel cells of the kind wherein planar fuel cells are arranged in a stack and connected in series by gas separators each serving as an interconnector.

Solid oxide electrolyte fuel cells are now a next target of research and development for practical applications, following first and second generation fuel cells, i.e., phosphoric acid fuel cells and molten carbonate fuel cells. A basic solid oxide fuel cell consists of three layers, i.e., a porous fuel electrode, a gas tight solid electrolyte and a porous air electrode. The solid oxide fuel cells have advantages that a loss of the electrolyte as found in the fuel cells of the prior art does not takes place as all the cell components are made of a solid material, and that high conversion efficiency (electrical output/heat content of fuel) is expected because of their high operating temperature of about 1000° C.

For practical applications, however, they have various problems awaiting a solution. For example, difficulties are encountered in the development of cell components which are stable for a long period of time at the high operating temperatures of the cell. Other problems are found in formation of electrodes on the solid electrolyte, and in gas sealing means to prevent gas leakage between the cell components. Especially, it is required to develop a new sealing means to prevent gas leakage since the wet sealing means employed in the first and second generation fell cells can not be applied to the solid oxide fuel cells.

U.S. Pat. No. 4,799,936 discloses a method for forming monolithic solid oxide fuel cell. In this method, a solid oxide fuel cell composed of corrugated triplex layers and interconnectors are formed in the green state, and then heated by a combination of microwave and conventional heating to form a monolithic body. Thus, there is no need to provide sealing means between the fuel cells and interconnectors because of a monolithic structure of the solid oxide fuel cell module. However, such a method cannot be applied to solid oxide fuel cells comprising cell components of a metal or alloy.

As a gas sealing means for planar solid oxide fuel cells, it is considered to be effective to apply a ceramic binder to contacting surfaces of the fuel cell and gas separators. However, if the fuel cells and gas separators are joined completely by the ceramic binder to form a fuel cell stack, distortion would be produced at their junction during rising or lowering of the temperature because of difference in thermal expansion coefficient between them, resulting in cracking of the electrolyte. Also, the adhesive property of the ceramic binder is lowered by thermal cycles, resulting in leakage of the gas.

SUMMARY OF THE INVENTION

It is therefore an object of the present invention to provide a solid oxide electrolyte fuel cell with improved gas sealing properties, which overcomes the aforesaid disadvantages.

Another object of the present invention is to provide a solid oxide electrolyte fuel cell which is stable in electrical characteristics for a long period of time.

According to the present invention, there is provided a solid oxide fuel cell assembly comprising at least one planar fuel cell consisting of a solid oxide electrolyte sandwiched by an anode and a cathode, and at least two gas separators having gas passages for supplying anode gas and cathode gas to said anode and cathode, said fuel cell and separators being arranged one on the another to form a fuel cell assembly, said gas separators except for the uppermost separator being integrally provided at its periphery with an upwardly extending side wall spaced from adjacent upper gas separator to form a space surrounding said fuel cell located thereon, said space being charged with a nonconducting high viscous melt.

In a preferred embodiment, all the gas separators are in the form of a flat-plate and the gas separators sandwiched between adjacent fuel cells are provided at its both surfaces with process gas chambers. The cell stack is arranged in an open topped, box-like housing so that a space surrounding the cell stack is formed between the cell stack and the housing, and the space is charged with a nonconducting high viscous melt.

The lowermost gas separator may be replaced with an open-topped, box-like housing having a cathode gas chamber formed in its inner bottom surface. In this case, the fuel cell stack is arranged in the housing so that the bottom of the housing serves as the lowermost gas separator, and a space formed between the cell stack and housing is charged with a nonconducting high viscous melt.

According to the present invention, there is also provided a solid oxide fuel cell assembly comprising a plurality of planar solid oxide fuel cells each consisting of a solid oxide electrolyte sandwiched by an anode and a cathode and being provided with two pairs of through holes, and a plurality of planar gas separators each being provided with two pairs of through holes, said fuel cells and separators being arranged one on the other to form a fuel cell stack, said through holes in each pair of the fuel cells and those of the gas separators constituting a pair of internal manifolds for anode gas or cathode gas, said fuel cell stack being arranged in an open topped, box-like housing so that a space is formed between said stack and said housing, said space being filled with a nonconducting high viscous melt, each gas separator being provided in its at least one surface with a gas chamber and grooves, said gas chamber being connected to the through holes in one pair, each of said grooves being formed in the surface area between said gas chamber and one through hole constituting the internal manifold for the cathode gas or anode gas, which is different from the gas flowing through said gas chamber, and being opened at the sides of the gas separator, said grooves being communicated with said space and filled with the nonconducting high viscous melt.

The provision of grooves filled with the nonconducting high viscous melt makes it possible to prevent the anode gas in the anode gas chamber from being mixed with the cathode gas passing through the internal manifold, as well as to prevent the cathode gas in the cathode gas chamber from being mixed with the anode gas passing through the internal manifold.

In another preferred embodiment, the surfaces of the gas separators and fuel cells, where they are brought into contact with the nonconducting high viscous melt of the sealing material, are coated by protective ceramic coatings.

As a material for gas separators, it is preferred to use heat resisting alloys such as, for example, Ni-Cr alloys and Co-Ni-Cr alloys. The Ni-Cr alloys include, without being limited to, inconel #600, #601, and Hastelloy (Trademark of MITSUBISHI METAL CORP.). The Co-Ni-Cr alloys include, without being limited to, Heynesalloy (Trademark of MITSUBISHI METAL CORP.)

As a nonconducting high viscous melt serving as a sealing material, there may be used those such as, for example, low expansion borosilicate glass, glass ceramics mainly comprising $SiO_2$ and $B_2O_3$, and any of the well-known nonconducting, heat resisting glass compositions with a low expansion coefficient. Typical low expansion borosilicate glass includes, without being limited to, pyrex glass (Trademark of Corning Glass Works). It is preferred to use a glass composition with a high viscosity ranging from $10^2$ to $10^4$ poise at the operating temperature.

It is preferred to use a glass composition containing no alkali metals as the sealing material since the heat resisting metal or alloy used for the gas separators is readily corroded in the presence of ions of alkali metals such as sodium and potassium and since alkali metal ions cause the short circuiting of the fuel cells. However, if the glass composition containing some amount of alkali metals is employed as the sealing material, it is preferred to provide ceramic coatings with a thickness of 50 to 200 μm on surfaces of components of the fuel cell assembly or stack, said surfaces being brought into contact with the nonconducting high viscous melt. The provision of ceramic coating makes it possible to prevent the gas separators and fuel cells from corrosion and short circuiting.

As a material for ceramic coatings, there may be used oxides such as $Al_2O_3$, MgO, and BeO, or nitrides such as BN, AlN and the like. The ceramic coating may be formed by the well known thin film forming techniques such as ion plating, vapor deposition, chemical vapor deposition, plasma spraying under reduced pressure, and the like. Such a process makes it possible to produce fine, corrosion-resistant ceramic coatings with excellent adhesive property.

In the solid oxide fuel cell according to the present invention, the fuel cell and adjacent gas separators are sealed at their sides by the nonconducting high viscous melt of the sealing material, thus making it possible to prevent leakage of the gas around the contacting surfaces between adjacent components of the fuel cell assembly or fuel cell stack with ease.

The above and other objects, features and advantages of the present invention will become more apparent from the following description, taken in connection with the accompanying drawings which show, by way of example only, preferred embodiments of the present invention.

PREFERRED EMBODIMENT OF THE INVENTION

Figure 1:
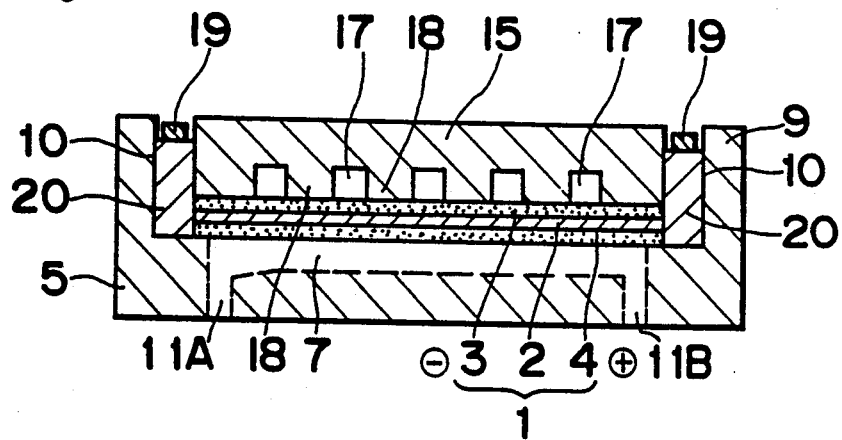
FIG. 1 is a section view of a solid oxide electrolyte fuel cell assembly, illustrating the principle of a sealing structure according to the present invention.
Figure 2:
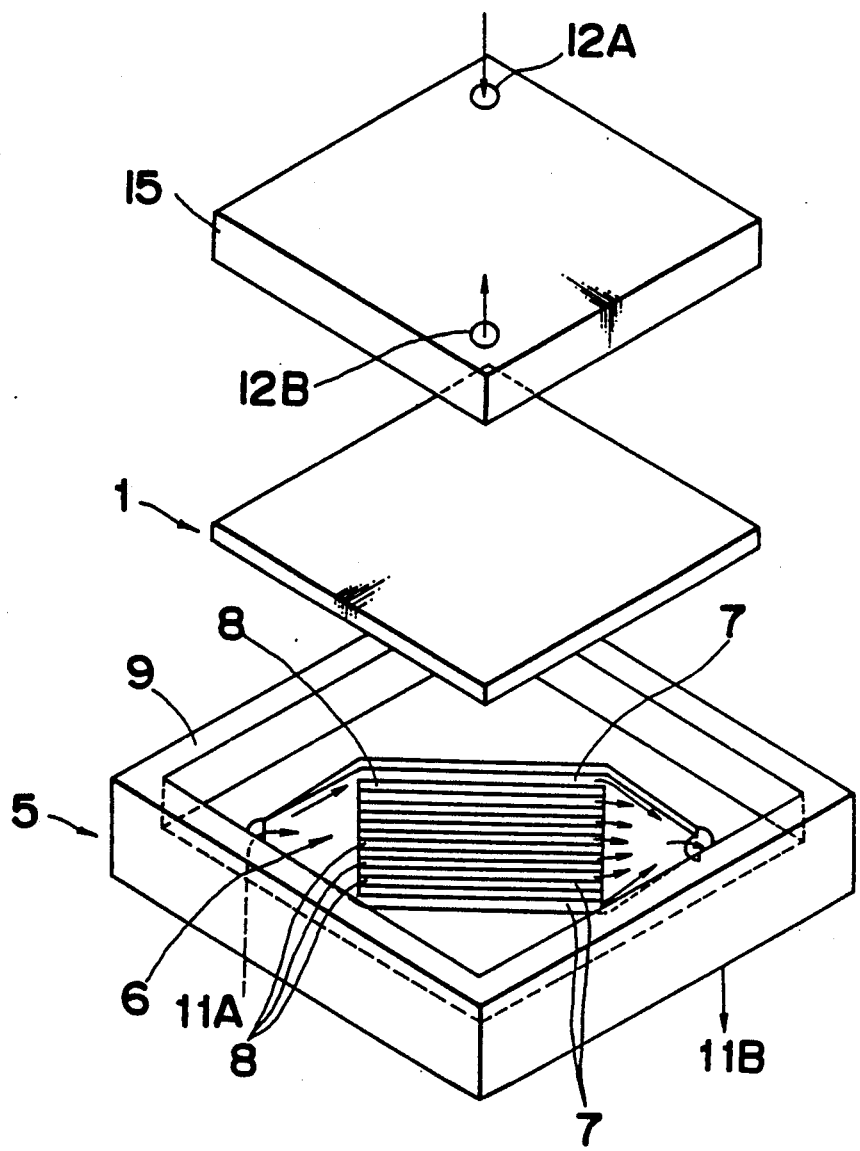
FIG. 2 is an exploded perspective view of the solid oxide fuel cell assembly shown in FIG. 1, in which a nonconducting high viscous melt of a sealing material is removed.

Referring to FIGS. 1 and 2, there is shown a solid oxide electrolyte fuel cell assembly comprising a solid oxide fuel cell (1), a pair of gas separators (5, 15), and a sealing material of a nonconducting high viscous melt (20) filled in a space formed between the components of the cell assembly. The fuel cell (1) consists of three layers, namely, a solid electrolyte layer (2) (usually, yttria stabilized zirconia), a fuel electrode or anode (3) (usually Nickel-zirconia cermet), and an air electrode or cathode (4) (usually, a complex perovskite lanthanum oxide such as $LaCoO_3$-$LaCrO_3$). This triplex solid oxide fuel cell (1) may be produced in the known manner, for example, by mixing each electrode material powder with a solvent, an organic binder and a plasticizer to prepare respective slurries for the anode and cathode, applying each resultant slurry on one surface of a planar electrolyte (2) to form green electrode layers with a thickness of 0.2 mm, and then firing the resultant triplex layers to complete a planar triplex fuel cell (1).

The gas separators (5, 15) are generally made of a heat resisting alloy, for example, a Ni-Cr alloy. As best shown in FIG. 2, the lower gas separator (5) is provided in its upper surface with a cathode gas supply chamber (6) including a plurality of cathode gas passages (7) separated by ribs (8) extending in parallel in the direction of the flow of the cathode gas. In accordance with the present invention, the lower gas separator (5) is integrally provided at its periphery with an upwardly extending rectangular side wall (9) to form a molten pool or space (10) surrounding the fuel cell (1) and upper gas separator (15). Thus, the lower gas separator (5) is in the form of an opentopped, square box-like member. Input and output manifolds (11A, 11B) for the cathode gas are integrally formed at the periphery of the lower gas separator (5), as shown in FIG. 2.

The upper gas separator (15) is formed into a square flat plate having input and output manifolds (12A, 12B) integrally formed at its periphery. Also, the upper gas separator (15) is provided in its lower surface with a anode gas supply chamber (not shown) having the same configuration as that of the cathode gas chamber (6), but the direction of flow of the anode gas is perpendicular to that of the cathode gas. The chamber includes a plurality of passages (17) separated by ribs (18) extending in parallel in the direction of the flow of the anode gas. The upper gas separator is small in size as compared with the upper surface of the lower gas separator (5) to form the space (10).

The space (10) is charged with a melt of low expansion borosilicate glass serving as the sealing material (20) to prevent gas leakage between adjacent components of the cell assembly. The nonconducting sealing material is covered with a frame-like nonporous ceramic plate 19 to reduce scattering of the melt.

In operation, the cathode gas or air is introduced into the passages (7) through the inlet manifold (11A) and fed to the cathode (4) of the fuel cell (1), where oxygen in the air is ionized by electrochemical reaction, $O_2 + 4e^- \rightarrow 2O^{2-}$. On the other hand, the anode gas or fuel is introduced into the passages (17) through the inlet manifold (12A) and fed to the anode (3) of the fuel cell (1), where it is oxidized by electrochemical reaction, $2O^{2-} + 2H_2 \rightarrow 2H_2O + 4e^-$. The air and fuel are partially consumed by fuel cell reactions to generate an electric power, while the remaining air and fuel are discharged through the outlet manifolds (11B) (12B), respectively.

At the operating temperature of the fuel cell, the sealing material is in the liquid state of a nonconducting high viscous melt, and provides tight seal between adjacent components, i.e., the fuel cell (1) and separators (5, 15), thus making it possible to prevent gas leakage between adjacent components of the cell assembly.

Figure 3:
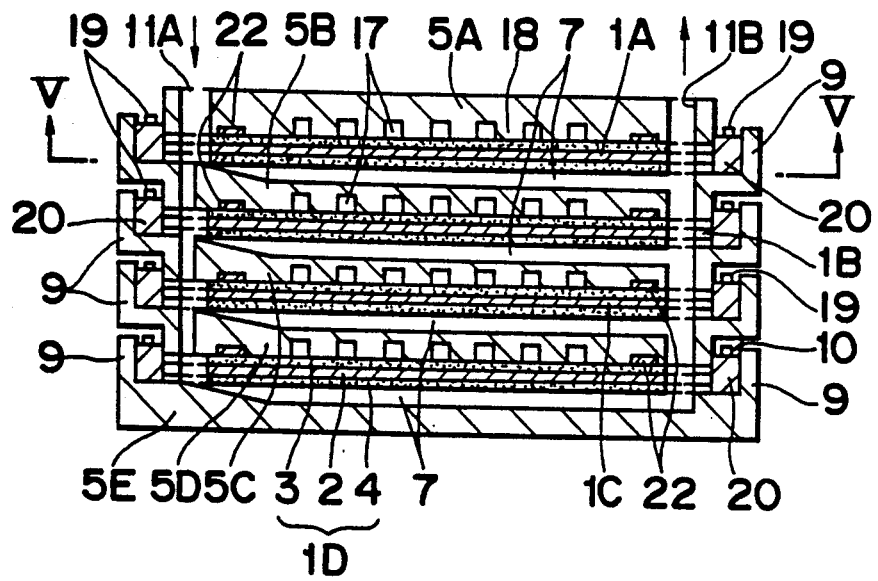
FIG. 3 is a section view of a solid oxide fuel cell stack embodying the present invention.
Figure 4:
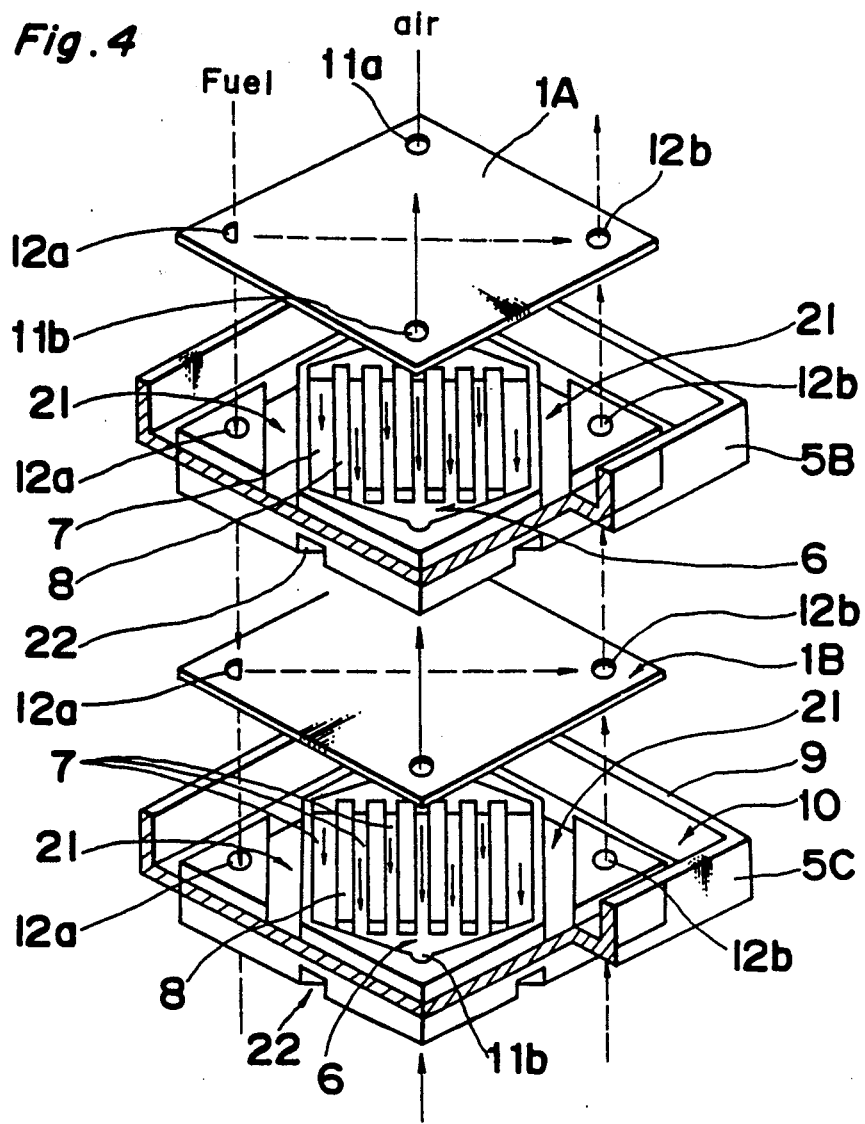
FIG. 4 is a partially cutaway, exploded perspective view of a part of the solid oxide fuel cell stack shown in FIG. 3, in which a nonconducting high viscous melt of a sealing material is removed.

Referring now to FIGS. 3 and 4, there is shown a solid oxide fuel cell stack embodying the present invention. The cell stack comprises four solid oxide fuel cells (1A, 1B, 1C, 1D) and plural gas separators (5A, 5B, 5C, 5D, 5E), which are alternately arranged one on the another to compose a fuel cell stack. The uppermost gas separator (5A) is in the form of a square half plate and has an anode gas chamber formed in its lower surface. This anode gas chamber has a configuration similar to that of the cathode gas chamber (6) mentioned below, and includes a plurality of passages (17) separated by ribs (18) extending in parallel in the direction of flow of the anode gas, which is perpendicular to that of the cathode gas.

The lower gas separators (5B, 5C, 5D) are provided with a side wall (9) so that they are in the form of an open topped box-like member. Each of the lower gas separators (5B, 5C, 5D) is provided in the upper surface with a cathode gas supply chamber (6) including a plurality of passages (7) separated by ribs (8), as best shown in FIG. 4. In each lower surface of the separators (5B, 5C, 5D), there is provided an anode gas supply chamber, which communicates with inlet and outlet manifolds (12a, 12b) and includes plural passages (17) separated by ribs (18) extending in the direction perpendicular to that of the ribs of the cathode gas chamber (6).

The lowermost gas separator (5E) is in the form of an open topped box-like member, but only a cathode gas supply chamber (16) is formed in the upper surface of the separator. Thus, the lowermost gas separator (5E) may be called as a half plate.

All the gas separators (5A, 5B, 5C, 5D) except for the lowermost separator (5E) are respectively provided with two pairs of through holes (11a and 11b, 12a and 12b) to provide two pairs of internal manifolds, as well as the fuel cells. The cathode gas (air) is supplied to passages (7) of each separator through the inlet manifold (11A) and then discharged therefrom through the outlet manifold (11B), whereas the anode gas is supplied to the passages (17) of each separator through the inlet manifold (not shown) and then discharged therefrom through the outlet manifold (not shown). Each hole or inlet manifold (11a) of the intermediate separators (5B, 5C, 5D) has a semicircular cross section to uniformly distribute the cathode gas to all the cathode gas supply chambers (6). Also, each hole or inlet manifold (12a) has the same semicircular cross section as that of the through hole (11a).

In each upper surface between the gas chamber (6) and through hole (12a or 12b) of the separators (5B, 5C, 5D, 5E), there are provided grooves (21), which extend in parallel in the direction parallel to that of the cathode gas flow and terminate at adjacent sides of each separator to form openings. The grooves (21) communicate with the space (10) formed between the upper half of the separator and its side wall (9). Another pair of grooves (22) are formed in each lower surface of the separators (5A, 5B, 5C, 5D) in such a manner that they extend in parallel in the direction parallel to that of the anode gas flow and terminate at adjacent sides of each separator to form openings, which communicate with the space (10) formed between the lower half of the separator and the side wall (9) of the other separator located just below.

The grooves (21, 22) are filled with a nonconducting high viscous melt (20) of low expansion glass to form a seal between the gas chamber and internal manifolds of each separator. This makes it possible to prevent mixing of the fuel and air in the fuel cell stack.

When assembling the solid oxide fuel cell stack with the above construction, low expansion borosilicate glass powder is charged in the grooves (21, 22) and space (10) formed between neighboring separators. In this case, it is preferred to use a mixture of relatively rough powder and fine powder to increase the charging density of the glass. The composition of the glass is so determined that it provides a nonconducting high viscous melt with a viscosity ranging from $10^2$ to $10^4$ poise. The grooves (21, 22) of each gas separator may be filled with the low expansion borosilicate glass powder before assembly of the cell stack. It is also possible to fill the grooves with molded glass having a shape corresponding to that of the groove. By heating the charged glass powder to the operating temperature of the fuel cell, the glass powder melts and the resultant nonconducting high viscous melt fills up gaps between adjacent components of the cell stack to form tight seals between them. A pressure of 4 Kg/cm$^2$ is applied to the cell stack so that its components are held in their own position during operation.

Figure 5:
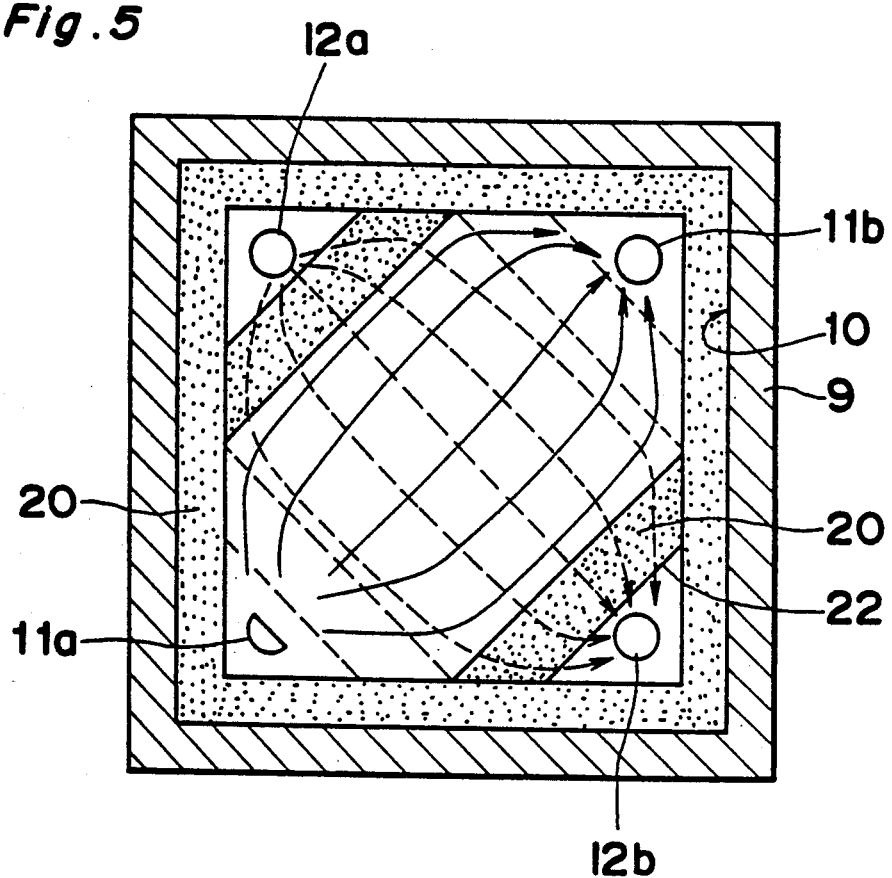
FIG. 5 is a section view of the cell stack taken along a line V—V in FIG. 3.

In operation, the cathode gas or air is fed to passages (7) of each separator through the inlet manifold (11A) and then partially discharged therefrom through the outlet manifold (11B). Similarly, the anode gas or fuel is fed to the passages (17) through the inlet manifold and then partially discharged therefrom through the outlet manifold. Since the passages (7) just below the fuel cell, for example, fuel cell (1A) and the passages (17) just above the fuel cell (1A) cross each other, the fuel flows in the direction perpendicular to that of the air as shown in FIG. 5. The glass serving as the sealing material (20) is melted at the operating temperature of the fuel cell and provides tight seal between adjacent components of the cell stack.

The fuel cells and gas separators are sealed at their sides or ends of the contacting surfaces by the nonconducting high viscous molten glass, thus making it possible to maintain sealing properties for a long period of time as the molten glass absorbs distortion of the components of the cell stack, which may occur during thermal cycles.

Figure 6:
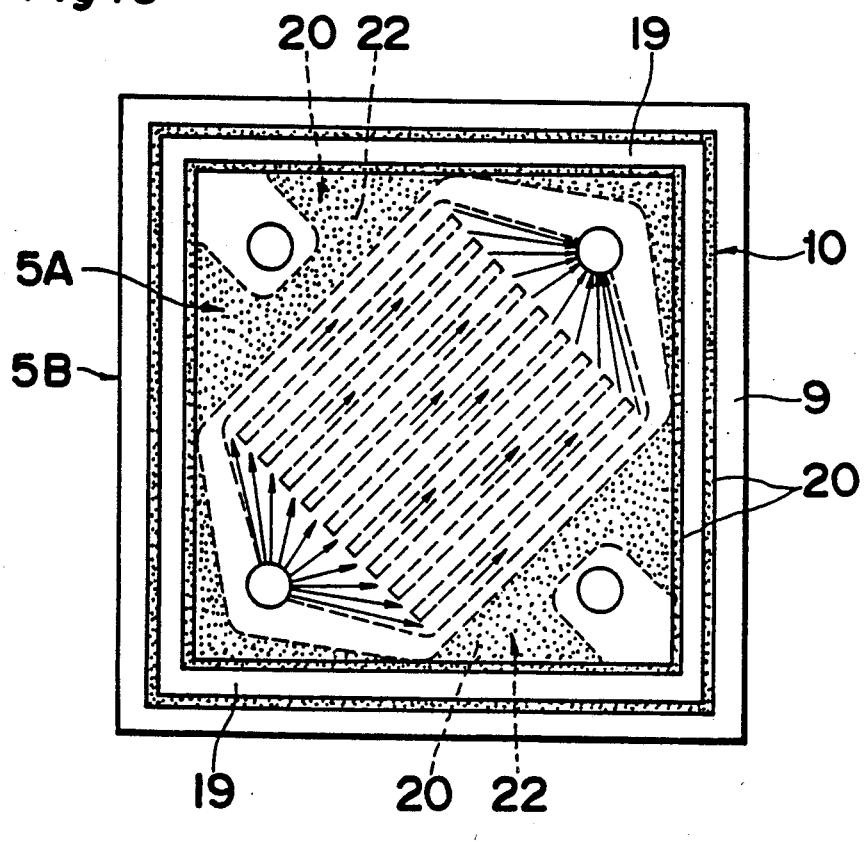
FIG. 6 is a top view of a solid oxide fuel cell stack, showing an alternative configuration of the gas separator used in the cell stack of the present invention.

In the above embodiment, the gas separators (5A, 5B, 5C, 5D) are provided with one or two pairs of grooves (21, 22) to prevent gas leakage between the fuel cell and separator, but they may take any configurations as occasion demands. For example, the separators may take a configuration as shown in FIG. 6.

Figure 7:
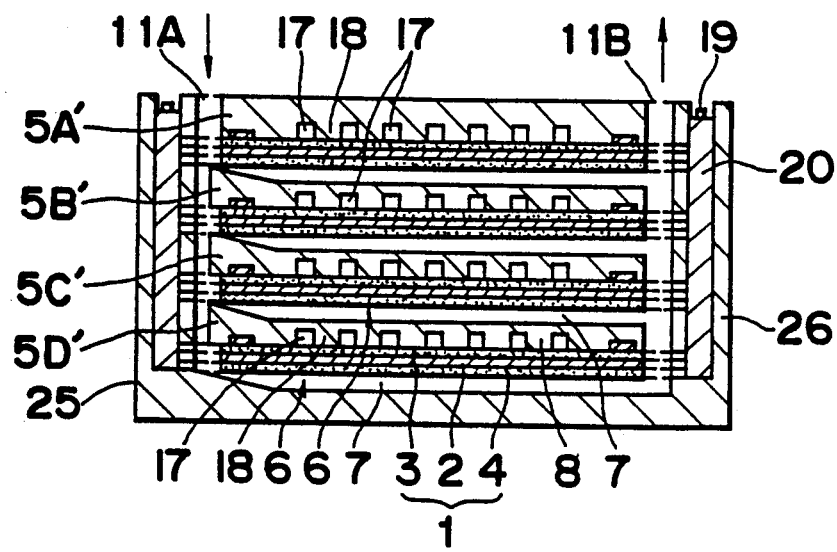
FIG. 7 is a section view of a solid oxide electrolyte fuel cell, showing another embodiment of the present invention.

FIG. 7 shows a solid oxide fuel cell stack of another embodiment of the present invention. The cell stack comprises four planar fuel cells (1A, 1B, 1C, 1D) and four gas separators (5A', 5B' 5C', 5D'), which are alternately arranged one on the another to form a cell stack and housed in an open-topped box-like member or housing (25). The housing (25) is made of a heat resisting material such as nickel alloys, cobalt alloys and the like, which are used for the gas separators. In the inner bottom surface of the housing (25), there is provided a cathode gas chamber (6) including plural passages (7) separated by ribs (8). Thus, the inner bottom surface has the same configuration as that of the upper surface of the gas separators (5B, 5C, 5D) mentioned below.

Figure 8:
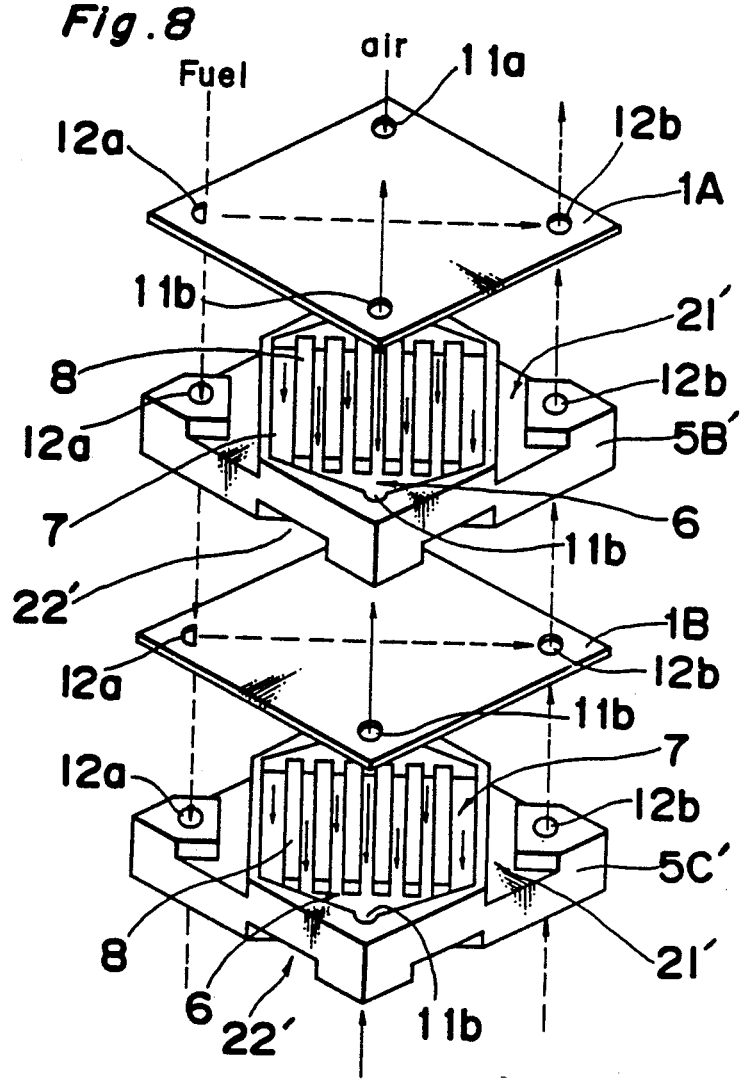
FIG. 8 is an exploded perspective view of a part of the solid oxide fuel cell stack shown in FIG. 7, in which a nonconducting high viscous melt of a sealing material is removed.

The gas separators (5A', 5B' 5C', 5D') have the same configuration as that of the corresponding gas separator (5A, 5B, 5C, 5D) of FIGS. 3 and 4, except for that they have no side wall and that the side openings of the grooves (21', 22'), which communicate with the space (10) between the cell stack and the housing (25), are enlarged as shown in FIG. 8. Such a configuration of the separator makes it possible to improve the sealing properties between adjacent components of the cell stack, and ensures that the grooves are filled with the molten glass.

Figure 9:
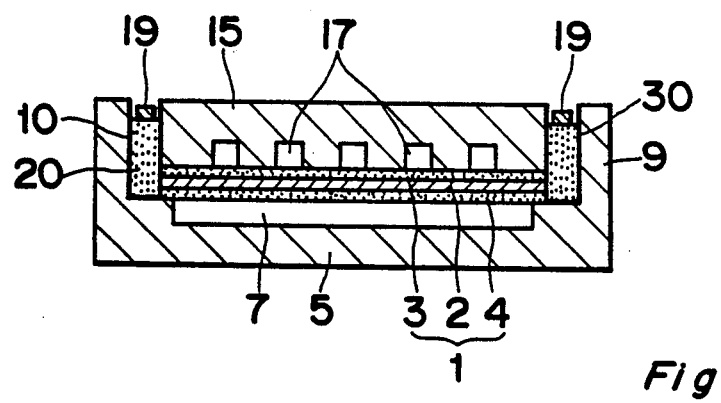
FIG. 9 is a section view of a solid oxide electrolyte fuel cell assembly embodying the present invention.
Figure 10:
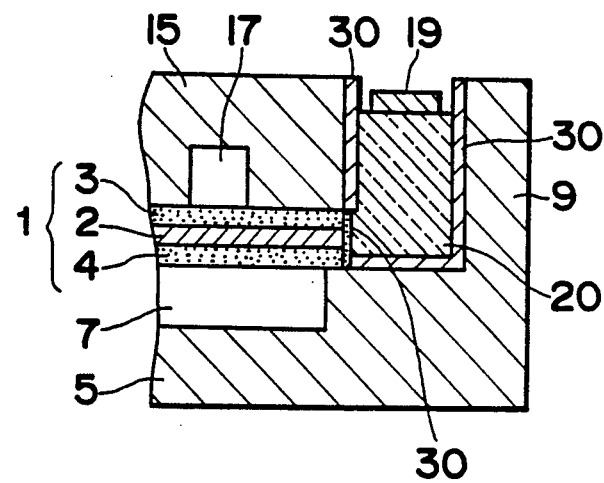
FIG. 10 is an enlarged section view of the fuel cell assembly of FIG. 9.

FIG. 9 shows another preferred embodiment of the solid oxide fuel cell assembly according to the present invention. The solid oxide fuel cell assembly has the same construction as that of the cell assembly of FIG. 1 except for that surfaces of the fuel cell (1) and separators (5, 15), which are brought into contact with the molten glass, are covered with ceramic coatings (30). As best shown in FIG. 10, the fuel cell (1) is provided on its side surfaces with a thin ceramic coating layer (30) having a thickness of 50 $\mu$mm, and the upper separator (15) is provided on its side surfaces with ceramic coatings having a thickness of 100 $\mu$m. The box-like lower separator (5) has a ceramic coating layer of 100 $\mu$m deposited on its inner surface of the side wall (9) and a part of the inner bottom surface, which are brought into contact with the molten glass.

Figure 11:
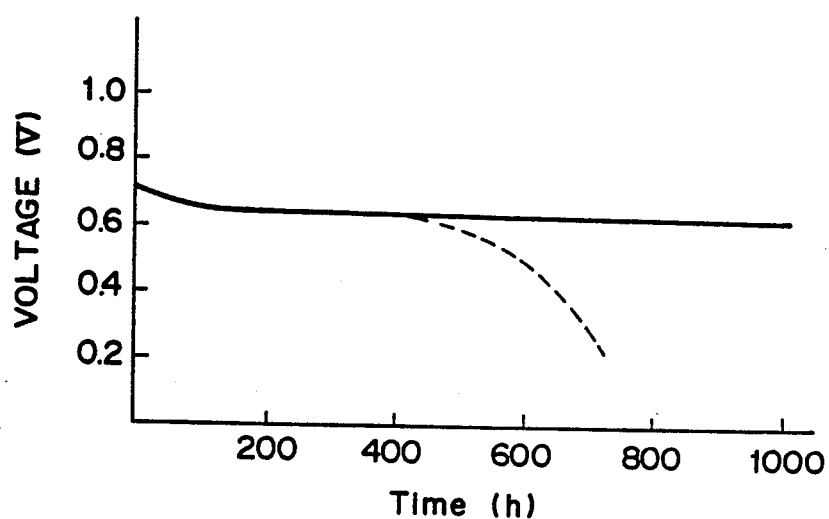
FIG. 11 is a graph showing discharging characteristics of the fuel cell assemblies of FIGS. 1 and 9.

The fuel cell assembly of FIG. 9 is heated to a temperature of 1000° C., and then operated under the conditions of 500 mA/cm² by supplying hydrogen gas (fuel) and oxygen (oxidant) to determine its discharging characteristics. A pressure of 4 kg/cm² is applied to the fuel cell assembly so that the components are held in their own position during operation. The result is shown in FIG. 11 together with that of the fuel cell of FIG. 1. In FIG. 11, a solid line shows the result for the fuel cell assembly of FIG. 9, and a broken line shows that for the fuel cell assembly of FIG. 1.

As shown in this figure, the fuel cell assembly of FIG. 1 possesses a considerable drop in the output voltage after a lapse of 500 hours, whereas the fuel cell assembly of FIG. 9 maintains its output voltage constant even after 1000 hours. Thus, the ceramic coatings prevent the space-forming surfaces of the components from being in contact with the molten glass and makes it possible to prevent the fuel cell assembly from lowering in the characteristics. It was observed that the transparent colorless molten glass used in the fuel cell assembly of FIG. 1 was changed to blackish brown after a lapse of 1000 hours, whereas a color change of glass was scarcely observed for the fuel cell assembly of FIG. 9. Qualitative analysis of metal ions with EPMA (electron probe micro analyzer) showed that the content of Ni and Cr in the glass used for the fuel cell assembly of FIG. 1 was considerably increased, whereas the content of metal ions in the glass used for the cell assembly of FIG. 9 was scarcely increased even after operation of 1000 hours.

Figure 12:
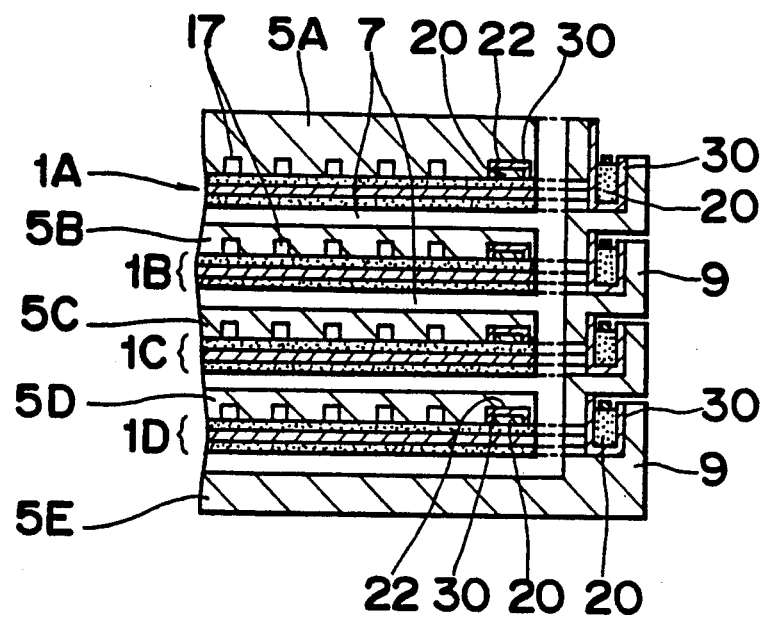
FIG. 12 is a section view of a solid oxide fuel cell stack showing another embodiment of the present invention.

FIG. 12 shows a solid oxide fuel cell stack embodying the present invention. The fuel cell stack of this embodiment has the same construction as that of the fuel cell stack of FIG. 3 except for that surfaces of the fuel cells (1A, 1B, 1C, 1D) and gas separators (5A, 5B, 5C, 5D, 5E), which are brought into contact with the sealing material of the molten glass, are covered with ceramic coatings (30). In this embodiment, the surfaces of the grooves (21, 22) are also coated with a thin ceramic layer with a thickness of 100 $\mu$m.

Figure 13:
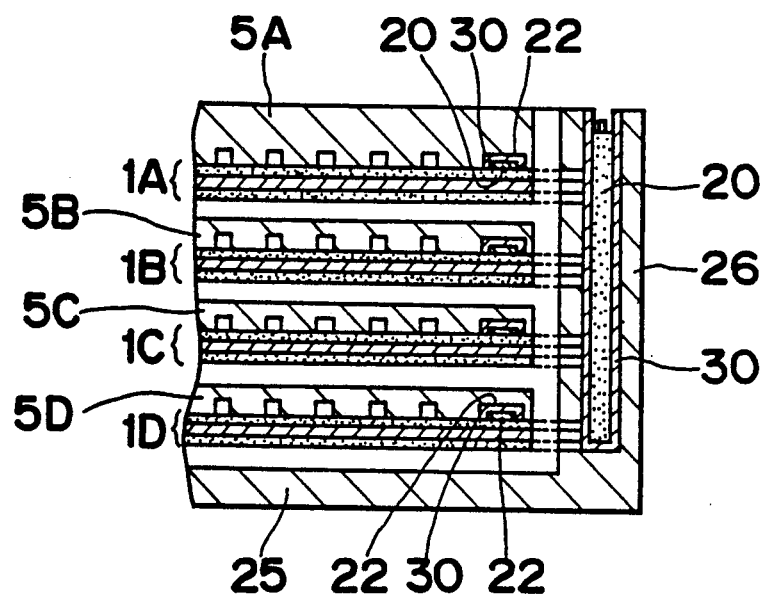
FIG. 13 is a section view of a solid oxide fuel cell stack showing still another embodiment of the present invention.

In the embodiment of FIG. 13, a solid oxide fuel cell stack has the same construction as that of the fuel cell stack of FIG. 7 except for that surfaces of the fuel cells (1A, 1B, 1C, 1D) and gas separators (5A, 5B, 5C, 5D, 5E), which are brought into contact with the molten glass, are covered with ceramic coatings (30).

What is claimed is:

1. A solid oxide fuel cell assembly comprising at least one planar fuel cell consisting of a solid oxide electrolyte sandwiched by an anode and a cathode, and at least two gas separators having gas passages for supplying anode gas and cathode gas to said anode and cathode, said fuel cell and separators being arranged one on the other to form a fuel cell assembly, said gas separators except for the uppermost separator being integrally provided at its periphery with an upwardly extending side wall spaced from adjacent upper gas separator to form a space surrounding said fuel cell located thereon, said space being charged with a nonconducting high viscous melt.

2. A solid oxide fuel cell assembly according to claim 1 wherein said nonconducting high viscous melt is composed of a glass composition selected from the group consisting of low expansion borosilicate glass, glass ceramics and heat resisting glass compositions with a low expansion coefficient.

3. A solid oxide fuel cell assembly according to claim 1 wherein nonconducting high viscous melt has a viscosity ranging from $10^2$ to $10^4$ poise at the operating temperature of the fuel cells.

4. A solid oxide fuel cell assembly according to claim 1 wherein said nonconducting high viscous melt is composed of a glass composition containing no alkali metal.

5. A solid oxide fuel cell assembly according to claim 1 wherein the gas separators and fuel cells are provided with protective ceramic coatings at surfaces where they are brought into contact with said nonconducting high viscous melt.

6. A solid oxide fuel cell assembly according to claim 5 wherein said ceramic coatings is of a material selected from the group consisting of oxides such as $Al_2O_3$, MgO, and BeO, and nitrides such as BN, AlN.

7. A solid oxide fuel cell assembly comprising a plurality of planar fuel cells consisting of a solid oxide electrolyte sandwiched by an anode and a cathode, and plural gas separators provided in its at least one surface with a gas chamber and grooves, said gas chamber being connected to internal manifolds for anode gas or cathode gas integrally formed in each gas separator, said fuel cells and separators being arranged one on the other to form a fuel cell stack, the gas separators except for the uppermost one being provided with a side wall so that a space is formed between said side wall and the upper separator located just above, said space formed between said side wall of lower gas separator and the lower part of the upper gas separator located just above being charged with a nonconducting high viscous melt, each of said grooves being formed between said gas chamber and internal manifold for supplying or discharging the cathode gas or anode gas which is different from the gas flowing through said gas chamber, so that they communicate with said space and are filled with said nonconducting high viscous melt.

8. A solid oxide fuel cell assembly according to claim 7 wherein said nonconducting high viscous melt is composed of a glass composition selected from the group consisting of low expansion borosilicate glass, glass ceramics and heat resisting glass compositions with a low expansion coefficient.

9. A solid oxide fuel cell assembly according to claim 7 wherein nonconducting high viscous melt has a viscosity ranging from $10^2$ to $10^4$ poise at the operating temperature of the fuel cells.

10. A solid oxide fuel cell assembly according to claim 7 wherein said nonconducting high viscous melt is composed of a glass composition containing no alkali metal.

11. A solid oxide fuel cell assembly according to claim 7 wherein the gas separators and fuel cells are provided with protective ceramic coatings at surfaces where they are brought into contact with said nonconducting high viscous melt.

12. A solid oxide fuel cell assembly according to claim 11 wherein said ceramic coatings is composed of a material selected from the group consisting of oxides such as $Al_2O_3$, MgO, and BeO, and nitrides such as BN, AlN.

13. A solid oxide fuel cell assembly comprising a plurality of planar solid oxide fuel cells each consisting of a solid oxide electrolyte sandwiched by an anode and a cathode and being provided with two pairs of through holes, and a plurality of planar gas separators each being provided with two pairs of through holes, said fuel cells and separators being arranged one on the other to form a fuel cell stack, said through holes in each pair of the fuel cells and those of the gas separators constituting internal manifolds for anode gas or cathode gas, said fuel cell stack being arranged in an open topped, box-like housing so that a space is formed between said stack and said housing, said space being filled with a nonconducting high viscous melt, each gas separator being provided in its at least one surface with a gas chamber and grooves, said gas chamber being connected to the through holes in one pair, each of said grooves being formed in the surface area between said gas chamber and one through hole constituting the internal manifold for the cathode gas or anode gas, which is different from the gas flowing through said gas chamber, and being opened at the sides of the gas separator, said grooves being communicated with said space and filled with the nonconducting high viscous melt.

14. A solid oxide fuel cell assembly according to claim 13 wherein said nonconducting high viscous melt is composed of a glass composition selected from the group consisting of low expansion borosilicate glass, glass ceramics and heat resisting glass compositions with a low expansion coefficient.

15. A solid oxide fuel cell assembly according to claim 13 wherein nonconducting high viscous melt has a viscosity ranging from $10^2$ to $10^4$ poise at the operating temperature of the fuel cells.

16. A solid oxide fuel cell assembly according to claim 13 wherein said nonconducting high viscous melt is composed of a glass composition containing no alkali metal.

17. A solid oxide fuel cell assembly according to claim 13 wherein the gas separators and fuel cells are provided with protective ceramic coatings at surfaces where they are brought into contact with said nonconducting high viscous melt.

18. A solid oxide fuel cell assembly according to claim 17 wherein said ceramic coatings is composed of a material selected from the group consisting of oxides such as $Al_2O_3$, MgO, and BeO, and nitrides such as BN, AlN.

* * * * *